(12) United States Patent
Stierlin (10) Patent No.: US 9,358,976 B2
(45) Date of Patent: Jun. 7, 2016

(54) METHOD FOR OPERATING A DRIVER ASSISTANCE SYSTEM OF A VEHICLE

(71) Applicant: Robert Bosch GmbH, Stuttgart (DE)

(72) Inventor: Susanne Stierlin, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/428,593

(22) PCT Filed: Aug. 28, 2013

(86) PCT No.: PCT/EP2013/067757
§ 371 (c)(1),
(2) Date: Mar. 16, 2015

(87) PCT Pub. No.: WO2014/040855
PCT Pub. Date: Mar. 20, 2014

(65) Prior Publication Data
US 2015/0274161 A1 Oct. 1, 2015

(30) Foreign Application Priority Data

Sep. 14, 2012 (DE) .......................... 10 2012 216 386

(51) Int. Cl.
*G06K 9/00* (2006.01)
*G06T 7/00* (2006.01)
(Continued)

(52) U.S. Cl.
CPC .......... *B60W 30/08* (2013.01); *G06K 9/00805* (2013.01); *G06T 7/0044* (2013.01); *G06T 7/208* (2013.01); *G08G 1/163* (2013.01); *H04N 7/188* (2013.01); *B60W 2550/10* (2013.01); *G06T 2207/10004* (2013.01);
(Continued)

(58) Field of Classification Search
None
See application file for complete search history.

(56) References Cited

U.S. PATENT DOCUMENTS 7,113,867 B1 * 9/2006 Stein .................. G06K 9/00805
701/301
2007/0112514 A1 * 5/2007 Ekmark ................ G08G 1/161
701/301
(Continued)

FOREIGN PATENT DOCUMENTS

EP 1741079 1/2007
GB 2489089 9/2012

OTHER PUBLICATIONS

International Search Report for PCT/EP2013/067757, issued on Nov. 25, 2013.
(Continued)

*Primary Examiner* — Vu Le
*Assistant Examiner* — Alexander J Lesnick
(74) *Attorney, Agent, or Firm* — Norton Rose Fulbright US LLP (57) ABSTRACT

A method is provided for operating a driver assistance system of a vehicle, including the following steps:
formation of video data that correspond to an object in a surrounding environment of a vehicle,
formation of at least one motion parameter of the object relative to the vehicle, based on the video data, and standardized to a distance between the vehicle and the object,
calculation of a collision-related threshold value based on the standardized motion parameter,
the driver assistance system carrying out an action as a function of a comparison between the threshold value and a collision-related parameter.
A driver assistance system, a vehicle, and a computer program are also provided.

6 Claims, 3 Drawing Sheets

(51) Int. Cl.
  *G06T 7/20*   (2006.01)
  *H04N 7/18*   (2006.01)
  *B60W 30/08*  (2012.01)
  *G08G 1/16*   (2006.01)

(52) U.S. Cl.
  CPC ............... *G06T 2207/10016* (2013.01); *G06T 2207/10028* (2013.01); *G06T 2207/20024* (2013.01); *G06T 2207/30236* (2013.01); *G06T 2207/30261* (2013.01)

(56) References Cited

U.S. PATENT DOCUMENTS

| | | | | |
|---|---|---|---|---|
| 2008/0074246 A1* | 3/2008 | Isaji | ............................ | B60T 7/22 340/435 |
| 2009/0143986 A1* | 6/2009 | Stein | ........................ | G08G 1/16 701/301 |
| 2010/0191391 A1* | 7/2010 | Zeng | ..................... | G01S 13/723 701/1 |
| 2011/0125372 A1* | 5/2011 | Ito | ....................... | B60R 21/0134 701/45 |
| 2011/0210872 A1* | 9/2011 | Molander | ............... | G01S 11/12 340/961 |
| 2012/0075122 A1* | 3/2012 | Whitlow | .................. | A61B 5/18 340/963 |
| 2012/0287276 A1* | 11/2012 | Dwivedi | ............ | G06K 9/00825 348/148 |
| 2012/0314071 A1* | 12/2012 | Rosenbaum | ...... | B60W 30/0956 348/148 |
| 2013/0166150 A1* | 6/2013 | Han | ...................... | B60W 10/18 701/42 |

OTHER PUBLICATIONS

Dagan et al:, "Forward collision warning with a single camera", Intelligent Vehicles Symposium, 2004, Piscataway, NJ, USA, 2004, pp. 37-42.

Adam Berthelot et al:, "A novel approach for the probabilistic computation of Time-To-Collision", Intelligent Vehicles Symposium (IV), 2012, pp. 1173-1178.

Sam-Yong Kim et al:, "An Intelligent and Integrated Driver Assistance System for Increases Safety and Convenience Based on All-around Sensing", Journal of Intelligent and Robotic Systems; Theory and Applications—(Incorporating Mechatronic Systems Engineering), vol. 51, No. 3, 2007, pp. 261-287.

* cited by examiner

METHOD FOR OPERATING A DRIVER ASSISTANCE SYSTEM OF A VEHICLE

FIELD OF THE INVENTION

The present invention relates to a method for operating a driver assistance system of a vehicle. The present invention further relates to a driver assistance system for a vehicle, to a vehicle, and to a computer program.

BACKGROUND INFORMATION

From European Patent No. 1 741 079, a method is known for estimating a time until a collision of a vehicle with an object. Here, a multiplicity of images of the object are recorded at known time intervals. A time until the collision is then determined solely from the information derived from the images and from the time intervals, the determination of the time until the collision being based on a relative velocity and a relative acceleration between the vehicle and the object.

SUMMARY

An object of the present invention can be regarded as the provision of an improved method for operating a driver assistance system of a vehicle.

The object of the present invention can also be regarded as the indication of a corresponding driver assistance system for a vehicle.

The object of the present invention can also be regarded as the indication of a corresponding vehicle.

In addition, the object of the present invention can be regarded as the provision of a corresponding computer program.

According to an aspect of the present invention, a method is provided for operating a driver assistance system of a vehicle. Here, video data are formed that correspond to an object in the surrounding environment of the vehicle. Based on the video data, at least one motion parameter of the object relative to the vehicle is formed, the motion parameter being standardized to a distance between the vehicle and the object. Subsequently, based on the standardized motion parameter, a collision-related threshold value is calculated. The driver assistance system then carries out an action as a function of a comparison between the threshold value and a collision-related parameter.

According to a further aspect of the present invention, a driver assistance system for a vehicle is provided. The driver assistance system includes an acquisition device for forming video data that correspond to an object in a surrounding environment of the vehicle. The driver assistance system further includes a data processing device for forming at least one motion parameter of the object relative to the vehicle, based on the video data, and standardized to a distance between the vehicle and the object. The data processing device is in addition fashioned to calculate a collision-related threshold value based on the standardized motion parameter. In addition, a control device is provided for carrying out an action as a function of a comparison between the threshold value and a collision-related parameter.

According to a further aspect of the present invention, a vehicle is provided that includes the driver assistance system.

According to another aspect of the present invention, a computer program is provided that includes program code for executing the method for operating a driver assistance system of a vehicle when the computer program is executed in a computer.

The present invention thus includes in particular the idea of calculating a collision-related threshold value based on the at least one standardized motion parameter. The driver assistance system uses this collision-related threshold value in particular in order to decide whether an action is to be carried out or not. For this purpose, in particular a comparison is carried out between the threshold value and a collision-related parameter.

That is, in particular, the collision-related threshold value is based on current real data, and to that extent is correspondingly adapted to the respective situation. That is, in particular, the driver assistance system does not use a single static threshold value, valid for all possible traffic situations, to make the decision whether an action is to be carried out or not; rather, the situation-adapted threshold value is used for the decision. In this way, critical situations can advantageously be avoided. In particular, a probability of a collision between the vehicle and the object can be reduced.

Preferably, a collision between the vehicle and the object can advantageously be avoided.

According to a specific embodiment, it can be provided that the driver assistance system includes a collision warning system, or is such a system. In particular, the driver assistance system is a system that makes a decision as to whether or not it provides a driver assistance function, for example an intervention in the guiding of the vehicle or a provision of a warning signal, as a function of video data and of a corresponding evaluation. The driver assistance system is based, so to speak, in particular on video data.

According to a specific embodiment, a plurality of standardized motion parameters can be provided. That is, in particular, a plurality of standardized motion parameters are formed, the collision-related threshold value in particular being calculated based on the plurality of standardized motion parameters.

According to a specific embodiment, it can be provided that a plurality of collision-related threshold values are calculated. In particular, the action is then carried out as a function of a respective comparison between the threshold values and collision-related parameters. In this way, an error tolerance is advantageously increased. In addition, in this way vehicle safety is advantageously increased, to the extent that a collision probability can be reduced. For example, the collision can advantageously be completely avoided.

Preferably, in general the following threshold values can be calculated:

1. Threshold values, such as a braking time and/or a time to collision threshold value; these two threshold values can also be designated collision-related threshold values.
2. Threshold values based on various input data formed by sensors, such as radar sensors. Thus, for example a mutual plausibility test of the threshold values, in particular of the collision-related threshold values, can be carried out.
3. Threshold values based on various parameters, such as a reaction time of the driver and/or a maximum possible deceleration with which the vehicle can be braked. In this way, for example various warning levels can be realized. That is, in particular, as a function of the above-named threshold values, warnings of a possible collision can take place with different strengths.

That is, in particular, the longer a reaction time of a driver, including a possible pre-warning time as an additional safety buffer, and the smaller an assumed deceleration of the vehicle, the earlier a warning is outputted or an intervention is carried out in the vehicle guidance, and the lower is an intensity level of an intervention or a warning.

Preferably, as collision-related parameter a reaction time of the driver, including the pre-warning time, can be used in the following equations for the threshold values. The corresponding comparison with the time to collision or braking time then takes place based on this parameter. This case can in particular be designated warning level 1.

In particular, as collision-related parameter exclusively the reaction time of the driver, i.e. without the pre-warning time, can be used in the following equations for the threshold values. The corresponding comparison with the time to collision or braking time then takes place based on this parameter. This case can in particular be designated warning level 2.

In particular, in the following equations for the threshold values the reaction time can be set to zero if the driver assistance system is to intervene autonomously in the vehicle guidance, because here it is not necessary to wait for a driver reaction. This case can in particular be designated warning level 3.

It can preferably be provided that the above-named three warning levels are each calculated separately. That is, in particular, based on the various parameters it is calculated whether a driver assistance function is to be triggered or provided, for example the outputting of a warning or intervention in vehicle guidance. Depending on which of the three warning levels that triggers a driver assistance function has been calculated, this function is correspondingly triggered with an intensity corresponding to the warning level. That is, in particular, the respective intensity increases, beginning with warning level 1 and increasing up to warning level 3. That is, in particular, the warning intensity according to warning level 1 is less than the warning intensity of warning level 2, which in turn is less than the warning intensity of warning level 3.

That is, in particular, different warning levels can be provided based on different parameters.

In the following embodiments, the following terms and abbreviations may be used:

$v_{rel}$: relative velocity between the vehicle and the object. The relative velocity is in particular equal to the velocity of the object minus the velocity of the vehicle.

$a_{rel}$: relative acceleration between the vehicle and the object. The relative acceleration is in particular equal to the acceleration of the object minus the acceleration of the vehicle.

$\tilde{v}$: standardized relative velocity between the object and the vehicle; can also be designated $v_{norm}$.

$\tilde{a}$: standardized relative acceleration between the object and the vehicle; can also be designated $a_{norm}$.

In particular, the following holds:

$$\tilde{a} = \frac{a_{rel}}{d} \text{ and } \tilde{v} = \frac{v_{rel}}{d}.$$

d: distance or spacing between the vehicle and the object;
$\Delta t_i$: time interval;
$s_i$: scaling value that corresponds to a change in size of the object from the video data over time interval $\Delta t_i$; corresponds in particular to the change in size of a ratio between two object widths at different times.
$\sigma_i$: measurement error parameter of the scaling value;
TTC: time to collision, i.e. the time until collision of the vehicle with the object;
$TTC_{schwell}$: time to collision threshold value;
TTB: braking time, corresponding to a time duration from a momentary time up to a time at which the vehicle has to be braked with a specified deceleration, in particular a maximum possible deceleration ($a_{max}$) or a comfortable deceleration ($a_{Komfort}$) in order to prevent the collision. TTB is an abbreviation of "time to brake." The TTB is thus defined as the time remaining until braking has to happen, with the expected deceleration, in order to still prevent the collision. The maximum possible deceleration is in particular a function of a design of the vehicle and/or the surrounding environment of the vehicle, for example whether the roadway is dry or wet.

$a_{max}$: the maximum possible deceleration with which the vehicle can be braked (application parameter); instead of or in addition to the maximum possible deceleration, in the above and following statements it is also possible to use a comfortable deceleration $a_{Komfort}$, where in particular $a_{Komfort} < a_{max}$. In this way, in particular decelerations that are too strong for the driver and other vehicle occupants can advantageously be avoided.

$\Delta t_{reakt}$: a reaction time of a driver (application parameter). The reaction time can in particular be an expected or specified reaction time. The reaction time can preferably additionally contain a pre-warning time, so that a safety time is advantageously calculated in.

In the following, ConstV designates a motion model that is based on the assumption that the object is moving relative to the vehicle with a constant relative velocity. In particular, the assumption holds that the relative acceleration is equal to the standardized relative acceleration, which is equal to zero.

In the following, ConstA designates a motion model that is based on the assumption that the object is moving relative to the vehicle with a constant relative acceleration.

According to a specific embodiment, it can be provided that a standardized relative acceleration and a standardized relative velocity are formed as standardized motion parameters. In particular, the parameter is a time to collision and the threshold value is a time to collision threshold value, the time to collision threshold value being calculated in particular according to one of the following mathematical equations.

$$TTC_{Schwell} = \Delta t_{reakt} + \frac{\tilde{v} + \tilde{a} \cdot \Delta t_{reakt}}{2 \cdot \left(\frac{a_{max}}{d} - \tilde{a}\right)},$$

if motion model ConstA holds.

$$TTC_{Schwell} = \Delta t_{reakt} + \frac{\tilde{v}}{2 \cdot \frac{a_{max}}{d}} = \Delta t_{reakt} + \frac{\tilde{v} \cdot d}{2 \cdot a_{max}}$$

if motion model ConstV holds, or the standardized relative acceleration is not taken into account.

According to a further specific embodiment, it can be provided that a standardized relative acceleration and a standardized relative velocity are formed as standardized motion parameters. In particular, the parameter is a defined reaction time of a driver and the threshold value is a braking time. Here, the braking time corresponds to a time duration from a momentary time up to a time by which the vehicle has to be braked with a maximum possible deceleration ($a_{max}$) in order to prevent the collision. The braking time is in particular calculated using the following mathematical equation.

$$TTB = \frac{\tilde{v}}{\tilde{a}} \pm \frac{1}{a}\sqrt{(\tilde{v}^2 - 2\tilde{a})\left(1 - \frac{\tilde{a} \cdot d}{a_{max}}\right)}$$

if motion model ConstA holds.

$$TTB = \frac{\tilde{v}}{2 \cdot \left(\tilde{a} - \frac{a_{max}}{d}\right)} - \frac{1}{\tilde{v}}$$

if motion model ConstV holds, or the standardized relative acceleration is not taken into account.

According to a further specific embodiment, it can be provided that a standardized relative acceleration and a standardized relative velocity are formed as standardized motion parameters, a time to collision and a defined reaction time of a driver being used as parameters. Preferably, a time to collision threshold value and a braking time are then used as associated threshold values. These threshold values can in particular be calculated using the above-named equations.

According to a specific embodiment, it can be provided that the collision-related parameters are calculated based on the at least one standardized motion parameter, in particular on the plurality of standardized motion parameters, in particular on the standardized relative acceleration and the standardized relative velocity.

Preferably, the TTC is calculated, depending on the valid motion model, as follows:

$$TTC_{constV} = -\frac{1}{v_{norm}}$$

if motion model ConstV holds.

$$TTC_{constA} = \frac{-v_{norm} \pm \sqrt{v_{norm}^2 - 2 \cdot a_{norm}}}{a_{norm}}$$

if motion model ConstA holds, or the standardized relative acceleration is not taken into account.

According to a further specific embodiment, it can be provided that the at least one standardized motion parameter, in particular the standardized relative velocity and the standardized relative acceleration, are formed by estimation, by measuring a scaling value or preferably a plurality of scaling values from the video data, the scaling value corresponding to a change in size of the object from the video data over a time interval, a measurement error parameter of the scaling value being determined and a Kalman filtering being carried out immediately based on the measured scaling value, the time interval, and the measurement error parameter, in order to estimate the standardized motion parameter.

That is, in particular, the at least one standardized motion parameter is estimated by using a Kalman filtering applied to the video data. In the sense of the present invention, "immediately" means in particular that the measured scaling value, the time interval, and the measurement error parameter are used directly for the Kalman filtering, i.e. are provided or sent directly to a Kalman filter. In particular, possible intermediate steps are not provided here. That is, in particular, the above-named values are not first of all further processed in order to form a corresponding intermediate value, this intermediate value only then being provided to the Kalman filter in order to carry out a Kalman filtering based on this intermediate value. That is, in particular, advantageously only one scaling value has to be measured per time interval in order to use the Kalman filtering to estimate the standardized motion parameter, i.e. in particular the standardized relative velocity and the standardized relative acceleration. Here, in known methods up to now it was necessary to measure a multiplicity of scaling values, these then being further processed for example using a maximum likelihood estimator, and these further processed values or data only then being provided to a Kalman filter. Because, however, in this pre-processing step the maximum likelihood estimator is dependent on working with a large number—as a rule more than ten, and in particular more than twenty—of scaling values, the corresponding computing steps are time-intensive and very computing-intensive. Thus, corresponding known methods of this sort are in particular not suitable for real-time use.

However, using the above-named steps according to the present invention with regard to the Kalman filtering, it is advantageously possible to significantly reduce the computing outlay, which advantageously enables real-time use. That is, in particular, corresponding threshold values can be formed or calculated reliably in real time. A corresponding reaction time on the part of the driver assistance system is thus advantageously reduced, which can result in a further reduction of a collision probability.

The scaling value between the two time points t, t', having temporal spacing $\Delta t$, can in particular be defined as follows:

$$s(\Delta t) = \frac{w(t)}{w(t - \Delta t)} = \frac{d(t - \Delta t)}{d(t)}$$

where s is the scaling value and w designates a two-dimensional width of the object in the image, i.e. in the corresponding video data.

In a further specific embodiment, it can be provided that the measurement error parameter corresponds to a standard deviation $\sigma$ of a measurement noise, having normal distribution, of the scaling value. That is, in particular the measurement error parameter corresponds to one standard deviation of the expected measurement error of the scaling value.

According to a further specific embodiment, it can be provided that a further collision-related threshold value is calculated based on object data differing from the video data and corresponding to the object in the environment around the vehicle, in particular the action additionally being carried out as a function of the further threshold value. Such object data differing from the video data can for example be radar data and/or ultrasound data and/or lidar (light detection and ranging) data. The statements made above in connection with the threshold value hold analogously for the further collision-related threshold value. That is, in particular, corresponding threshold values can also be calculated based on these object data. Here, it can be provided in particular that these collision-related further threshold values are calculated based on motion parameters of the object relative to the vehicle, in particular a relative velocity and a relative acceleration. That is, for example from the object data, for example radar data, lidar data, and/or ultrasound data, corresponding relative velocities, relative accelerations, and/or distances are calculated. Based on these calculated values, the further collision-related threshold value is then preferably calculated.

In particular based on radar data and/or ultrasound data and/or lidar data, a distance between the object and the vehicle and a relative acceleration can be measured directly. Based thereon, it can for example be provided that corresponding threshold values are calculated, and based thereon it is decided whether a driver assistance function is to be triggered. The result of this calculation, i.e. whether the driver assistance function is to be triggered or not, is compared to the result relating to the provision of the driver assistance function based on the calculations based on the standardized motion parameters calculated from the video data. Thus, two decisions, based on different data and calculations, are compared with one another, and a final decision as to whether the driver assistance function is to be provided or not is in particular a function of this comparison.

Through the provision of a further collision-related threshold value, calculated based on the object data differing from the video data, the reliability of the system can advantageously be significantly increased, in that a plausibility check can be carried out on the basis of the two threshold values. If, for example, one of the threshold values supplies values that are not plausible, this threshold value can be rejected. For example it can be provided that a new calculation is carried out. In particular, it can be provided that a system check is carried out.

According to a specific embodiment, it can be provided that the object data and the video data are fused with one another. In particular, it can be provided that the threshold value and the further threshold value are fused with one another. Such a fusion of data or threshold values can create redundancy. This is advantageously helpful in particular in safeguarding safety-relevant functions such as an automatic emergency braking assistance system. Such a system is also referred to as automatic emergency brake, or AEB.

According to a specific embodiment, it can be provided that as an action at least one action is carried out that is chosen from the following group of actions: provision of a warning signal, and intervention in a vehicle guidance. In particular, a plurality of actions, in particular the two above-named actions, can be carried out.

The provision of a warning signal includes in particular the provision of an audio warning signal and/or of a graphic warning signal and/or of a haptic warning signal.

The intervention in a vehicle guidance includes in particular an intervention in a braking system of the vehicle in order to brake the vehicle. The intervention in a vehicle guidance in particular includes an intervention in the steering system in order to steer the vehicle.

The controlling can for example control one or more actuators of the vehicle. In particular, the controlling can control one or more setting elements of the vehicle. That is, in particular the controlling can control corresponding vehicle systems such as a steering system, a braking system, and/or a drive system. That is, in particular, the controlling can control a warning signal provision device.

According to a specific embodiment, it can be provided that an intensity and/or a frequency of the warning signal is/are controlled as a function of the comparison. Thus, situations can be taken into account having different levels of critical significance, in that an intensity of a warning signal can be higher in one particular situation than in a different situation. This is due to the consideration that as a rule not every situation is equally critical.

According to a specific embodiment, it can be provided that the acquisition device includes a front video camera and/or a rear video camera. That is, in particular, in this way it is advantageously possible to monitor a front region of the vehicle and a rear region of the vehicle for possible objects with regard to a collision. That is, in particular, the method can also be applied to video data of a rear video camera.

Video data in the sense of the present invention are in particular formed using a video camera, for example a front video camera or a rear video camera. The camera can for example be fashioned as a mono camera or as a stereo camera. Preferably, the camera is part of a multi-camera system, the multi-camera system having a multiplicity of cameras.

Stereo video data of a stereo camera offer in particular the possibility of calculating disparity maps, and thus distance values. From these, similar to the case of sensors that measure distance directly, such as radar, ultrasound, or lidar sensors, the collision decision can then be made, i.e. a decision as to whether a driver assistance function is to be provided or not.

It can preferably be provided that a corresponding mono video algorithm is applied to the video image data of the two cameras of a stereo camera. In this way, a diversified approach is provided, and it is possible to plausibilize the stereo results, or to mutually plausibilize the results from the individual cameras.

According to a further specific embodiment, it can be provided that the intensity of the warning signal is controlled as a function of the parameters that are used, and/or as a function of threshold values, such as the specified deceleration or the reaction time. In particular, this controlling can also be carried out only as a function of one of the parameters used.

DETAILED DESCRIPTION

In the following, identical reference characters may be used for identical features.

Figure 1:
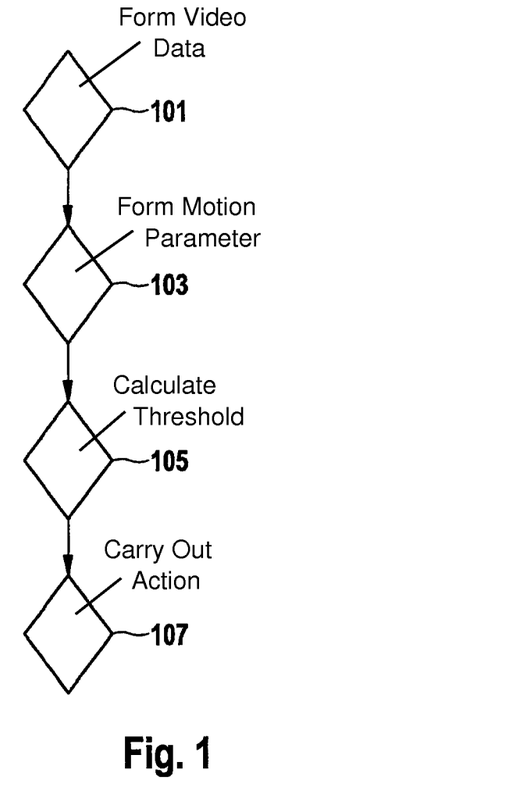
FIG. 1 shows a flow diagram of a method for operating a driver assistance system of the vehicle.

FIG. 1 shows a flow diagram of a method of a driver assistance system of a vehicle.

According to a step 101, video data are formed that correspond to an object in the surrounding environment of the vehicle. The video data are formed in particular using a monocular video system. Preferably, the video data are formed by a stereo or multi-camera system. A monocular video system preferably includes a mono camera. Preferably, it can be provided that the mono camera is fashioned as a front camera of the vehicle. That is, in particular, the front camera acquires a region in front of the vehicle and forms corresponding video data. Preferably, it can be provided that the mono camera is fashioned as a rear camera of the vehicle. That is, in particular, the rear camera acquires a region behind the vehicle and forms corresponding video data. In particular it can be provided that the vehicle has both a rear camera and a front camera.

According to a step 103, at least one motion parameter of the object relative to the vehicle is formed based on the video data, the motion parameter being standardized to a distance between the vehicle and the object. The standardized motion parameter can be for example a standardized relative acceleration and a standardized relative velocity, or only a standardized relative velocity. In particular, a plurality of standardized motion parameters can be formed, in particular a standardized relative velocity and a standardized relative acceleration.

According to a step 105, a collision-related threshold value is calculated based on the standardized motion parameter. The collision-related threshold value can for example be a time to collision threshold value or a braking time.

According to a step 107, an action is carried out by the driver assistance system as a function of a comparison between the threshold value and a collision-related parameter. That is, in particular, it is for example checked whether the collision-related parameter is less than, greater than, less than or equal to, greater than or equal to, or equal to the collision-related threshold value. As a function of this check, an action is then in particular carried out or not.

The action can be for example the provision of a warning signal. In particular, the action can include an intervention in a vehicle guidance. In particular, both the warning signal is provided and intervention in the vehicle guidance also takes place.

Thus, for example, it can be checked whether a time to collision is less than a time to collision threshold value. If this is the case, a warning signal is outputted, and/or an intervention is made in a vehicle guidance. Thus, it can be for example provided that, if it is determined that the braking time is less than a defined reaction time of a driver, a warning signal is then provided and/or an intervention is then made in a vehicle guidance. In particular, it can be provided that the collision-related parameter is calculated based on the at least one standardized motion parameter.

Given different parameterizations of $\Delta t_{reakt}$ and $a_{max}$ and associated calculations of $TTC_{schwell}$ and/or TTB, with subsequent comparison, different warning levels can be realized. That is, in particular, warning takes place with a higher intensity if a traffic situation is more critical in comparison to a less critical traffic situation, in which a warning takes place correspondingly with a lower intensity. The thresholds at which a warning intensity changes are in particular calculated as a function of the above-named threshold values and/or the above-named parameters.

Figure 2:
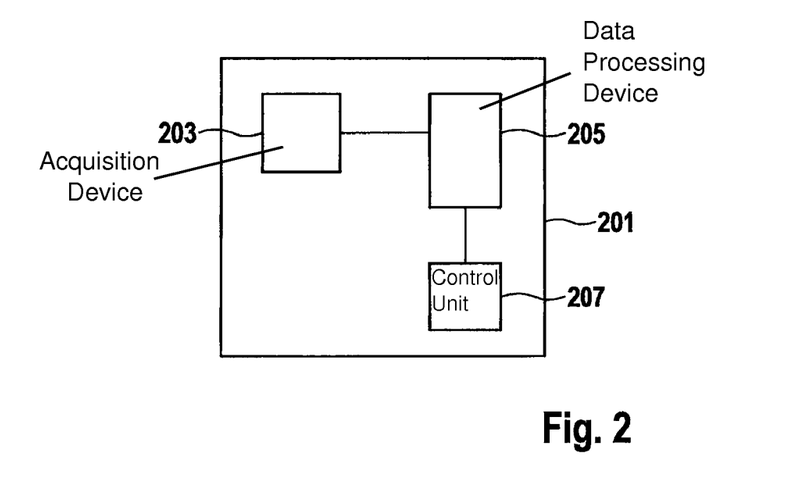
FIG. 2 shows a driver assistance system for a vehicle.

FIG. 2 shows a driver assistance system 201 for a vehicle (not shown).

Driver assistance system 201 includes an acquisition device 203 for forming video data corresponding to an object in the surrounding environment of a vehicle. Acquisition device 203 can for example include a monocular video system.

In addition, driver assistance system 201 includes a data processing device 205 that is fashioned to form at least one motion parameter of the object relative to the vehicle, standardized to a distance between the vehicle and the object, based on the video data. Data processing device 205 is in particular further fashioned to calculate a collision-related threshold value based on the standardized motion parameter. In the case of a plurality of standardized motion parameters, data processing device 205 is in particular correspondingly fashioned to also form the plurality of standardized motion parameters and to carry out corresponding calculations.

Moreover, driver assistance system 201 includes a control unit 207 for carrying out an action as a function of a comparison between the threshold value and a collision-related parameter. For example control unit 207 can control one or more actuators of the vehicle. In particular, control unit 207 can control one or more setting elements of the vehicle. That is, in particular, control unit 207 can control corresponding vehicle systems, such as a steering system, a brake system, and/or a drive system. That is, in particular, control unit 207 can control a warning signal provision device.

Figure 3:
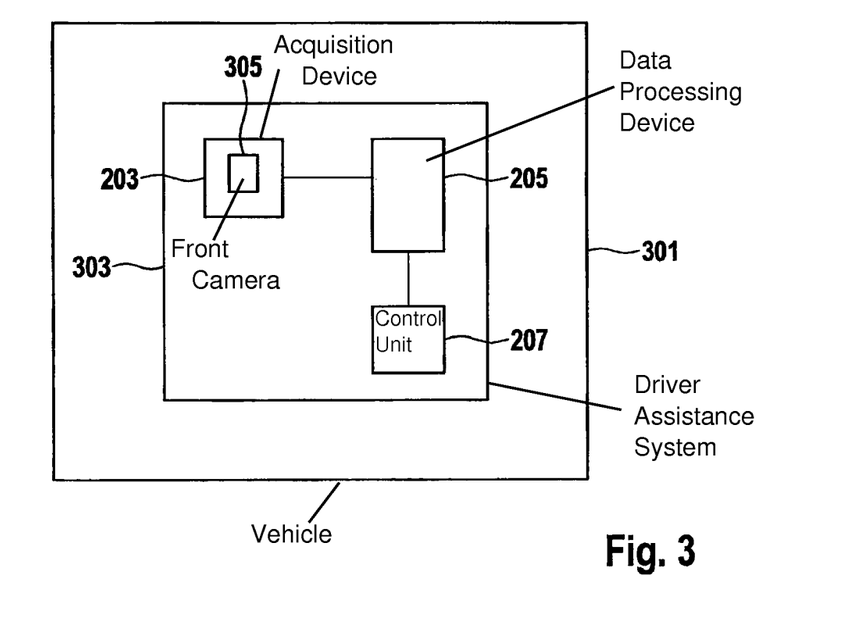
FIG. 3 shows a vehicle.

FIG. 3 shows a vehicle 301 including a driver assistance system 303. Driver assistance system 303 is designed essentially analogous to driver assistance system 201 as shown in FIG. 2. As a difference, acquisition device 203 of driver assistance system 303 of vehicle 301 according to FIG. 3 has a front camera 305. In a specific embodiment that is not shown, it can be provided that a rear camera is provided in addition to or instead of front camera 303. In particular, the camera, i.e. the front or rear camera, or cameras, i.e. for example the front camera or the rear camera, can be part of a mono, stereo, or multi-camera system.

Figure 4:
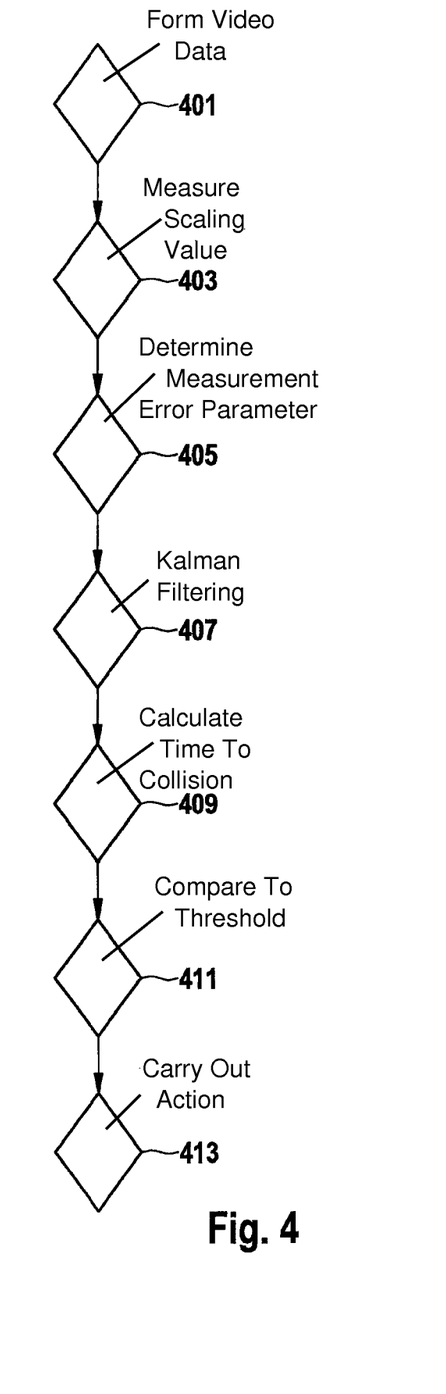
FIG. 4 shows a flow diagram of a further method for operating a driver assistance system of a vehicle.

FIG. 4 shows a flow diagram of a further method for operating a driver assistance system of a vehicle.

According to a step 401, video data are formed that correspond to an object in the environment surrounding the vehicle. According to a step 403, a scaling value is measured from the video data, the scaling value corresponding to a change in size of the object from the video data over a time interval.

According to a step 405, in addition a measurement error parameter of the scaling value is determined. According to a step 407, a Kalman filtering is carried out immediately based on the measured scaling value, the time interval, and the measurement error parameter, in order to estimate the standardized motion parameter, in particular in order to estimate the plurality of standardized motion parameters.

According to a step 409, in addition a time to collision is calculated. That is, in particular, a time until collision between the vehicle and the object is calculated.

According to a step 411, the time to collision threshold value is compared to the time to collision, and, as a function of the comparison, an action is carried out according to step 413.

In a specific embodiment that is not shown, it can be provided that, in addition to or instead of the calculation of the time to collision threshold value, a braking time is calculated. In the comparison according to step 411, it is then in particular provided that the braking time is compared to a defined reaction time of a driver, and a corresponding action is then carried out as a function of this comparison.

In sum, therefore, the present invention includes in particular the idea of calculating standardized motion parameters, in particular estimating them using a Kalman filtering, and using these for example to calculate a braking time and/or a time to collision threshold value. Subsequently, in particular a comparison can be provided between the threshold values and collision-related parameters, and preferably a corresponding action can be provided that is a function of the comparison. These standardized motion parameters, such as for example the standardized relative acceleration and the standardized relative velocity, can easily and reliably be estimated using the Kalman filtering. Thus, video data of a monocular video system can advantageously be used as a basis for these estimations.

Here, in the existing art it is the case that for the calculation of corresponding threshold values recourse must be had to a relative acceleration, a relative velocity, and a distance, these above-named values not being capable of being measured directly from video data, and thus being capable of being calculated only with the aid of expensive estimation methods that have significant uncertainty. In contrast to this, however, due to the use of the standardized motion parameters based on a Kalman filtering, computing outlay is significantly reduced and the quality of the results is significantly increased. In particular, in this way real-time use is advantageously enabled. In addition, it is now possible advantageously to use video data without the occurrence of disadvantages with regard to real-time capacity or computing outlay.

If an intervention of the driver assistance system is to be carried out, then in the calculations forming the basis the driver's reaction time $\Delta t_{reakt}$ can be set to zero, because an autonomously acting system of this type does not have to wait on a reaction of the driver.

In a specific embodiment that is not shown, it can be provided that data of a stereo video system, preferably of a multi-camera system, are also used. Because it is also possible to process mono video data out from individual images of a stereo video system, so that based thereon the above-named method steps according to the present invention are carried out, the further stereo data can also be used to form corresponding threshold values. In particular, an independent Kalman filtering is carried out relating to the mono video data, in particular in general a filtering, and the collision-related threshold values can then in particular be determined therefrom. These values are then fused with the stereo data in particular in a common function. Such diversity can advantageously be used in a safeguarding of safety-relevant functions such as automatic emergency brake (AEB) assistance.

What is claimed is:

1. A method for operating a driver assistance system of a vehicle, comprising:
   forming video data that correspond to an object in a surrounding environment of a vehicle;
   forming at least one motion parameter of the object relative to the vehicle, based on the video data, and standardized to a distance between the vehicle and the object, wherein a standardized relative acceleration (ã) and a standardized relative velocity (ṽ) are formed as standardized motion parameters;
   calculating a collision-related threshold value based on the standardized motion parameters; and
   controlling the driver assistance system to carry out an action as a function of a comparison between the threshold value and a collision-related parameter, wherein the carried out action includes at least one of providing a warning signal and intervening in a vehicle guidance;
   wherein the collision-related parameter is a time to collision and the threshold value is a time to collision threshold value $TTC_{schwell}$ that is calculated according to the following mathematical equation:

$$TTC_{schwell} = \Delta t_{reakt} + \frac{\tilde{v} + \tilde{a} \cdot \Delta t_{reakt}}{2 \cdot \left(\frac{a_{max}}{d} - \tilde{a}\right)}$$

wherein $\Delta t_{react}$ is a specified reaction time of a driver of the vehicle, and $\alpha_{max}$ is a specified maximum possible braking deceleration of the vehicle.

2. The method as recited in claim 1, further comprising:
   calculating a further collision-related threshold value based on object data, differing from the video data, that correspond to the object in the surrounding environment of the vehicle, the action being carried out additionally as a function of the further threshold value.

3. The method as recited in claim 1, further comprising controlling an intensity of the warning signal as a function of the comparison.

4. A method for operating a driver assistance system of a vehicle, comprising:
   forming video data that correspond to an object in a surrounding environment of a vehicle;
   forming at least one motion parameter of the object relative to the vehicle, based on the video data, and standardized to a distance d between the vehicle and the object, wherein a standardized relative acceleration (ã) and a standardized relative velocity (ṽ) are formed as standardized motion parameters;
   calculating a collision-related threshold value based on the standardized motion parameters; and
   controlling the driver assistance system to carry out an action as a function of a comparison between the threshold value and a collision-related parameter, wherein the carried out action includes at least one of providing a warning signal and intervening in a vehicle guidance;
   wherein the collision-related parameter is a defined reaction time $(\Delta t_{reakt})$ of a driver and the threshold value is a braking time TTB that corresponds to a time duration from a momentary time up to a time at which the vehicle has to be braked with a specified deceleration in order to prevent the collision, the braking time TTM being calculated using the following mathematical equation:

$$TTB = \frac{\tilde{v}}{\tilde{a}} \pm \frac{1}{\tilde{a}} \sqrt{(\tilde{v}^2 - 2\tilde{a})\left(1 - \frac{\tilde{a} \cdot d}{a_{max}}\right)}$$

wherein $\alpha_{max}$ is a specified maximum possible braking deceleration of the vehicle.

5. A driver assistance system for a vehicle, comprising:
   an acquisition device for forming video data that correspond to an object in the surrounding environment of a vehicle;
   a data processing device for forming at least one motion parameter of the object relative to the vehicle, based on the video data, and standardized to a distance between the vehicle and the object, wherein a standardized relative acceleration (ã) and a standardized relative velocity (ṽ) are formed as standardized motion parameters, and for calculating a collision-related threshold value based on the standardized motion parameters; and
   a control unit for carrying out an action as a function of a comparison between the threshold value and a collision-related parameter, wherein the carried out action includes at least one of providing a warning signal and intervening in a vehicle guidance;
   wherein the collision-related parameter is a time to collision and the threshold value is a time to collision threshold value $TTC_{schwell}$ that is calculated according to the following mathematical equation:

$$TTC_{schwell} = \Delta t_{reakt} + \frac{\tilde{v} + \tilde{a} \cdot \Delta t_{reakt}}{2 \cdot \left(\frac{a_{max}}{d} - \tilde{a}\right)}$$

wherein $\Delta t_{react}$ is a specified reaction time of a driver of the vehicle, and $\alpha_{max}$ is a specified maximum possible braking deceleration of the vehicle.

6. A non-transitory computer-readable medium storing a computer program comprising program code for executing, when the computer program is executed in the computer, a method for operating a driver assistance system of a vehicle, the method comprising:
   forming video data that correspond to an object in a surrounding environment of a vehicle;
   forming at least one motion parameter of the object relative to the vehicle, based on the video data, and standardized to a distance between the vehicle and the object, wherein a standardized relative acceleration (ã) and a standardized relative velocity (ṽ) are formed as standardized motion parameters;

calculating a collision-related threshold value based on the standardized motion parameters; and controlling the driver assistance system to carry out an action as a function of a comparison between the threshold value and a collision-related parameter, wherein the carried out action includes at least one of providing a warning signal and intervening in a vehicle guidance;

wherein the collision-related parameter is a time to collision and the threshold value is a time to collision threshold value $TTC_{schwell}$ that is calculated according to the following mathematical equation:

$$TTC_{schwell} = \Delta t_{reakt} + \frac{\tilde{v} + \tilde{a} \cdot \Delta t_{reakt}}{2 \cdot \left(\frac{a_{max}}{d} - \tilde{a}\right)}$$

wherein $\Delta t_{reakt}$ is a specified reaction time of a driver of the vehicle, and $\alpha_{max}$ is a specified maximum possible braking deceleration of the vehicle.

\* \* \* \* \*